US009874877B2

United States Patent
Meinecke et al.

(10) Patent No.: US 9,874,877 B2
(45) Date of Patent: Jan. 23, 2018

(54) METHOD AND SYSTEM FOR AUTOMATICALLY CONTROLLING A FOLLOWING VEHICLE WITH A SCOUT VEHICLE

(71) Applicant: VOLKSWAGEN AG, Wolfsburg (DE)

(72) Inventors: Marc-Michael Meinecke, Sassenburg (DE); Arne Bartels, Wolfsburg (DE); Lutz Junge, Braunschweig (DE); Michael Darms, Lehre (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/377,579

(22) Filed: Dec. 13, 2016

(65) Prior Publication Data

US 2017/0168505 A1 Jun. 15, 2017

(30) Foreign Application Priority Data

Dec. 15, 2015 (DE) .................. 10 2015 225 238

(51) Int. Cl.
*B60T 7/22* (2006.01)
*G08G 1/00* (2006.01)
(Continued)

(52) U.S. Cl.
CPC ......... *G05D 1/0295* (2013.01); *B60W 30/165* (2013.01); *G01C 21/00* (2013.01);
(Continued)

(58) Field of Classification Search
CPC ...... G08G 1/096725; G08G 1/00; B60T 7/22; G09B 19/0015; H04L 67/12; G06Q 30/0283; G05D 1/0891
See application file for complete search history.

(56) References Cited

U.S. PATENT DOCUMENTS 9,619,203 B2 *   4/2017  Tamir .................. G08G 1/00
2007/0027583 A1 * 2/2007  Tamir .................. G06Q 30/0283
                                           701/1
(Continued)

FOREIGN PATENT DOCUMENTS

| DE | 19949448 A1 | 5/2001 |
|---|---|---|
| DE | 102005059517 A1 | 6/2007 |
| DE | 102012212681 A1 | 1/2013 |
| DE | 102012208256 A1 | 11/2013 |

(Continued)

OTHER PUBLICATIONS

Search Report for European Patent Application No. 16199172.4; dated Apr. 19, 2017.

*Primary Examiner* — Yuri Kan
(74) *Attorney, Agent, or Firm* — Barnes & Thornburg LLP

(57) ABSTRACT

A method and system for automatically controlling at least one following vehicle where a scout trajectory is produced for a scout vehicle and the scout vehicle is guided along an actual trajectory, the actual trajectory of the scout vehicle and scout environmental data is captured by scout sensors. A desired trajectory is produced for the following vehicle and following vehicle environmental data are captured by following vehicle sensors. A scout trajectory similarity is determined based on the scout trajectory produced and the captured actual trajectory, reference trajectory data are produced and reference environmental data are produced based on the scout environmental data. The reference trajectory data and the reference environmental data are transmitted to the following vehicle and a trajectory similarity is determined by a trajectory comparison based on the desired trajectory produced and the transmitted reference trajectory data.

15 Claims, 3 Drawing Sheets

(51) Int. Cl.
*G05D 1/02* (2006.01)
*B60W 30/165* (2012.01)
*G08G 1/0967* (2006.01)
*G01C 21/00* (2006.01)
*B60W 50/00* (2006.01)

(52) U.S. Cl.
CPC ....... *G05D 1/0221* (2013.01); *G08G 1/09675* (2013.01); *G08G 1/096725* (2013.01); *G08G 1/096791* (2013.01); *G08G 1/22* (2013.01); *B60W 2050/008* (2013.01); *B60W 2050/0077* (2013.01); *B60W 2550/408* (2013.01); *B60W 2750/40* (2013.01); *G05D 2201/0213* (2013.01)

(56) References Cited

U.S. PATENT DOCUMENTS

| | | | |
|---|---|---|---|
| 2007/0208483 A1* | 9/2007 | Rabin | G05D 1/0891 701/72 |
| 2013/0144465 A1* | 6/2013 | Shida | B60T 7/22 701/1 |
| 2016/0358479 A1* | 12/2016 | Riedelsheimer | H04L 67/12 |
| 2017/0221381 A1* | 8/2017 | Tamir | G09B 19/0015 |

FOREIGN PATENT DOCUMENTS

| | | |
|---|---|---|
| DE | 102013212255 A1 | 12/2014 |
| DE | 102013225011 A1 | 6/2015 |
| DE | 102014202509 A1 | 8/2015 |

\* cited by examiner

METHOD AND SYSTEM FOR AUTOMATICALLY CONTROLLING A FOLLOWING VEHICLE WITH A SCOUT VEHICLE

PRIORITY CLAIM

This patent application claims priority to German Patent Application No. 10 2015 225 238.8, filed 15 Dec. 2015, the disclosure of which is incorporated herein by reference in its entirety.

SUMMARY

Illustrative embodiments relate to a method for automatically controlling at least one following vehicle. Illustrative embodiments also relate to a system for automatically controlling at least one following vehicle using a scout vehicle.

BRIEF DESCRIPTION OF THE DRAWINGS

Disclosed embodiments are now explained with reference to the drawings, in which.

DETAILED DESCRIPTION

Figure 1:
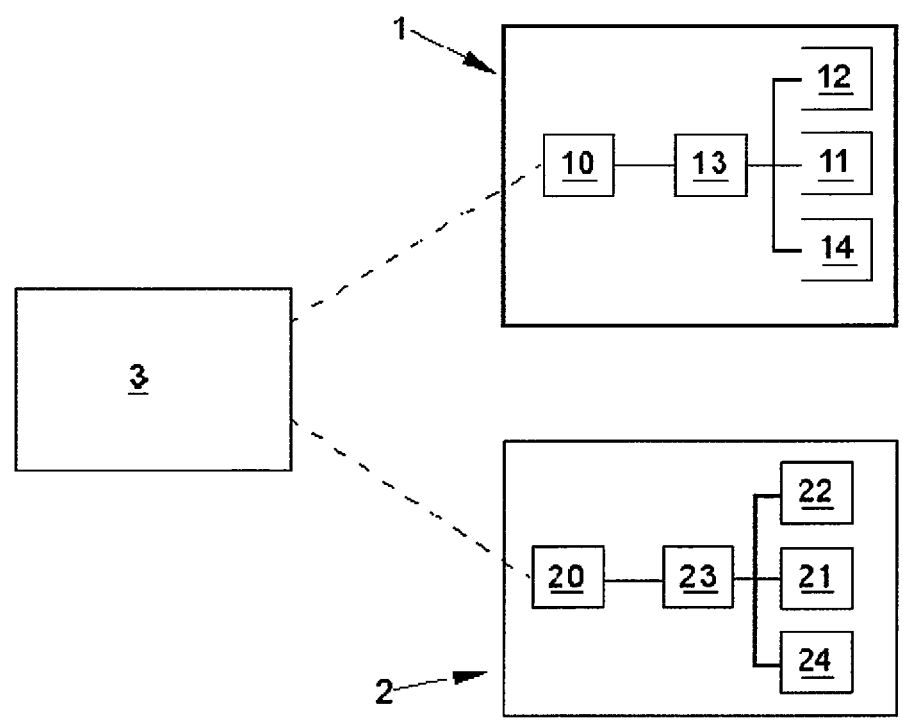
FIG. 1 shows an exemplary embodiment of the disclosed system.

To increase the efficiency and safety in traffic and in logistics, in particular when transporting goods, or else when transporting persons, the aim is to extensively automate vehicles. For this purpose, techniques are already known which relieve pressure on the driver by means of automatic interventions in the control of a vehicle at various levels or carry out individual driving maneuvers in a fully automatic manner. This extends to remote control or to the autonomous driving of a route by a vehicle.

DE 10 2005 059 517 A1 describes such a system for guiding and operating a vehicle without a driver, data being forwarded from sensors of the vehicle to an operations center and operating data for controlling the vehicle being transmitted from the operations center to the vehicle. In this case, data transmission between the vehicle and the operations center in near real time is assumed and a time delay which possibly occurs is technically compensated for.

In the method described in DE 10 2013 212 255 A1, a first vehicle uses a sensor system to check a space relative to the first vehicle and transmits the result of the check to a second vehicle. As a result, the second vehicle can be informed, for example, of whether a space in the environment of the first vehicle is free and whether it is possible to move back into a lane.

In the method described in DE 10 2013 225 011 A1, in a motor vehicle traveling in a highly automated manner, the motor vehicle's own position is compared with external data relating to a current traffic situation and a decision is made with regard to whether it is necessary to change the driving state. It is detected whether the vehicle is traveling toward an obstacle or a route section which otherwise cannot be automatically driven on. This may result in the automated journey being aborted, for instance. For example, it is possible to process a blockage of a route section in front of the vehicle for the automated journey or a traffic jam message can be used to abort the highly automated journey in good time.

A central prerequisite for the safe operation of such systems is a high degree of redundancy in the safety precautions used. Typically, the automatic performance of a driving maneuver presupposes the presence of a driver who monitors the movement of the vehicle and can carry out corrective interventions. This prevents malfunctions of the system, for instance in the case of defective sensors or in unusual traffic situations. In this case, completely automatic driving is therefore not implemented, but rather assisted driving. In this case, the degree of automation is adapted to the technical design of the system, in particular the redundancies provided.

If the system is intended to be operated in a fully automatic manner, that is to say without a driver being provided for each vehicle, high degrees of redundancy must be provided at the technical level. This is achieved, for instance, by installing a multiplicity of sensors—some of which have multiple configurations—in the vehicle. However, the possibilities of integrating sensors in a vehicle are spatially restricted in this case and considerable additional costs may also arise.

Disclosed embodiments provide a method and a system of the type mentioned at the outset in which control which has a high degree of automation is achieved.

In the disclosed method, a scout trajectory is produced for a scout vehicle. The scout vehicle is guided along an actual trajectory, the actual trajectory of the scout vehicle and scout environmental data being captured by means of scout sensors. A desired trajectory is produced for the following vehicle and following vehicle environmental data are captured by means of following vehicle sensors. A scout trajectory similarity is determined on the basis of the scout trajectory produced and the captured actual trajectory, reference trajectory data are produced and reference environmental data are produced on the basis of the scout environmental data. The reference trajectory data and the reference environmental data are transmitted to the following vehicle and a trajectory similarity is determined by means of a trajectory comparison on the basis of the desired trajectory produced and the transmitted reference trajectory data. An environmental data similarity is determined by means of an environmental data comparison on the basis of the captured following vehicle environmental data and the transmitted reference environmental data, in which case, if the trajectory similarity and/or the environment similarity exceed(s) a particular threshold value, automatic control of the following vehicle is activated. If, in contrast, the trajectory similarity and/or the environment similarity do(es) not exceed a particular threshold value, a safe driving mode of the following vehicle is activated.

The route to be driven on is therefore checked for its drivability in a plurality of stages. A check is first of all carried out to determine whether the trajectory driven on by a scout vehicle matches a trajectory automatically produced for this purpose. A following vehicle then checks whether its own desired trajectory matches the trajectory of the scout vehicle or matches a trajectory assessed as automatically drivable. A high degree of redundancy and thus a high degree of safety are therefore achieved. An additional comparison of environmental data makes it possible to continuously check in this case whether the conditions on the route have changed since the route was driven on by the scout vehicle, that is to say whether a route which was previously automatically driven on can also still be safely automatically driven on.

According to the disclosed embodiments, "trajectory" denotes a movement path along which one of the vehicles involved can travel. "Trajectory" can be understood as meaning movement paths which have actually been travelled and planned movement paths. The trajectory can be of any desired length; for example, it may comprise a route section on a road or a longer route between two geographical positions.

According to the disclosed embodiments, "trajectory similarity" denotes a measure which quantitatively indicates the degree of similarity of two or more trajectories. A higher value of the trajectory similarity may represent greater similarity in this case. It is therefore possible to determine whether trajectories compared with one another substantially match one another or how greatly they differ from one another. For example, the distance between the trajectories, in particular their minimum and maximum distance, can be taken into account in this case. Direction changes along the trajectories to be compared can also be taken into account, for instance by considering the first derivative of the trajectories, with the result that trajectories running in a parallel manner, for example, can be assessed to be more similar than those with a very different course.

In the first operation, a route or a route section, for example, a public road, a path inside a closed area or in a building, is driven on by a scout vehicle. In this case, a scout trajectory is first of all produced while the scout vehicle is guided along a true actual trajectory. In the case of automatic production, the scout trajectory can be produced, for instance, by a journey planner or a navigation system of the scout vehicle and by assistance systems. The scout trajectory then corresponds to a calculated movement path of the vehicle. Furthermore, the scout trajectory can be produced in another manner, for instance manually, by remote control or by another specification, for instance by means of capture from an external database.

The vehicle is guided along an actual trajectory which does not necessarily exactly correspond to the theoretical scout trajectory. This may be due to the fact, for example, that the vehicle must evade obstacles, for instance other vehicles, or that the actual conditions of the route do not exactly correspond to the cartographic initial data for planning the scout trajectory. Manual vehicle guidance can be carried out, for instance by a driver or by remote control.

The actual trajectory along which the scout vehicle actually moves is captured, in which case satellite-based systems, for instance, or else other positioning and route determination methods known per se can be used. The actual trajectory is captured in such a manner that a comparison with the scout trajectory can be carried out. During this comparison, a scout trajectory similarity is determined and is used to quantitatively indicate the degree of similarity. It is therefore possible to check the extent to which the actual trajectory which has actually been driven on matches the automatically calculated scout trajectory, that is to say whether automatic control on the basis of the produced scout trajectory would have resulted in a drivable trajectory. This corresponds to an autopilot of the vehicle in a "passive test mode" which is used to check the decisions made by the autopilot. The scout trajectory produced must be sufficiently similar to the actual trajectory which has actually been driven to be assessed as automatically drivable.

The scout trajectory and the actual trajectory are used to produce reference trajectory data which comprise, for instance, all relevant information relating to the actual trajectory. The reference trajectory data comprise the actual trajectory and information relating to its automatic drivability, for example, assessed on the basis of the scout trajectory similarity. These reference trajectory data are transmitted to the following vehicle and can now be processed by the latter. The transmission can be carried out in various ways which are known per se, by means of a radio connection, for instance directly or indirectly via a data transmission network.

The scout vehicle also comprises scout sensors which are used to capture scout environmental data. These environmental data characterize the route driven on and therefore relate, for instance, to features of the ground which has been driven on, for example, the route course, road markings or the condition of the ground covering, signs, buildings, plants and landscape features in the environment of the route. The sensors used are known per se and can be combined as desired.

To also make it possible for the following vehicle to process the scout environmental data, reference environmental data are produced and comprise, for instance, all relevant information relating to the scout environmental data. These reference environmental data are transmitted together with the above-mentioned reference trajectory data, to the following vehicle and can now be processed by the latter. The transmission can again be carried out in various ways which are known per se, by means of a radio connection, for instance directly or indirectly via a data transmission network.

After the scout vehicle has driven on the actual trajectory, the data captured during this journey are used to check whether the following vehicle can automatically drive on the trajectory:

A desired trajectory is first of all produced, for instance by a journey planner of the following vehicle, along which desired trajectory the following vehicle is intended to be automatically controlled. The scout vehicle and the following vehicle may comprise similar or functionally identical journey planners which, owing to their function, calculate at least approximately identical trajectories under the same conditions. However, different journey planners may also be used or similar journey planners may arrive at different results on account of changed circumstances.

The following vehicle receives the reference trajectory data and carries out a trajectory comparison, in which case the desired trajectory is compared with the scout trajectory. Sections of the trajectories which at least correspond to one another are considered. It is therefore quantified whether and how greatly the trajectories produced by the systems of the scout vehicle and of the following vehicle differ.

The following vehicle also comprises following vehicle sensors which capture following vehicle environmental data. In this case, these sensors may capture substantially the same features of the route and of the environment as the sensors of the scout vehicle, but the same sensor types are not necessarily used and the number of sensors may differ. The important factor is that the following vehicle environmental data and the scout environmental data provide at least partially comparable results, for example, by virtue of the data identifying the position of particular buildings at the edge of the route or detecting other structures, for instance a road marking or traffic signs.

The following vehicle environmental data and the reference environmental data are compared with one another in the following vehicle and an environment similarity is determined. Checking the environment similarity makes it possible to ensure that the following vehicle is actually on the same trajectory as the scout vehicle and it is possible to check whether and to what extent the features of the route to be driven on have changed after the route has been driven on by the scout vehicle. For example, it is possible to determine whether the course of the road has changed since then, for instance in the case of roadworks, and whether these changes are so serious that the route possibly can no longer be automatically driven on in a safe manner.

Threshold values, for instance, can be determined for the trajectory similarities and for the environment similarity to decide whether a trajectory can be automatically driven on by the following vehicle in a safe manner. These threshold values can be permanently defined or can be determined in a variable manner. If the similarities are great enough, the automatic control of the following vehicle for the desired trajectory is activated, that is to say the automated journey of the following vehicle along the desired trajectory is enabled.

The following vehicle captures further data for automatic control. For this purpose, further sensors may be present or the same sensors as those used for the comparison with the scout environmental data can be used. For example, it is possible to capture data relating to moving objects in the immediate environment of the following vehicle, from which the following vehicle must keep its distance or must evade. These data are not relevant to the comparison with the scout environmental data since they are not features of the route driven on, but rather depend on the individual vehicle and typically change in the short term.

If the threshold values are not reached or exceeded, a safe driving mode of the following vehicle is activated. In the safe driving mode, the following vehicle can be safely guided on a trajectory which is unsuitable for automatic control. For example, the environmental data similarity can then no longer reach the particular threshold value if the route guidance has changed after the scout vehicle has captured the scout environmental data. For example, roadworks or a barrier in the event of an accident may result in it being necessary to swerve into another lane and the alternative route no longer being assessed as automatically drivable. In the safe driving mode, the speed of the vehicle can be reduced, possibly until the vehicle stops at a suitable location. Furthermore, a driver of the following vehicle can be notified and can assume manual control of the following vehicle, the driver being able to be situated in the following vehicle or the following vehicle being able to be remotely controlled.

The driver can be notified, for example, by outputting an acoustic and/or visual warning signal. Whereas the driver can deal with other tasks while the automatic control is activated, he now assumes control manually. In this case, the manual control can nevertheless be assisted by various assistance systems, for example, a lane-keeping assistant, adaptive cruise control and/or a lane-change assistant. Furthermore, a particular period may be provided for the transition from the automatic control to the manual control, the following vehicle being stopped at a suitable location, for example, when the driver does not assume control within the particular transition period.

In at least one disclosed embodiment of the method, manual control of the following vehicle is activated in the safe driving mode of the following vehicle, the following vehicle being guided along a substitute trajectory by a following vehicle driver and the substitute trajectory being captured by means of the following vehicle sensors. In this case, the reference trajectory data are newly produced on the basis of the captured substitute trajectory, and the reference environmental data are newly produced on the basis of the following vehicle environmental data. This allows the reference trajectory data and reference environmental data to be continuously updated.

In this case, the following vehicle assumes the role of the scout vehicle and, under manual control, drives on a trajectory which was previously identified as not automatically drivable. In this case, data relating to the desired trajectory and to the substitute trajectory actually driven on by the following vehicle are used to produce the reference trajectory data and the following vehicle environmental data also become the basis for newly produced reference environmental data. These data can then in turn be made available to other vehicles to enable them to automatically drive on the trajectory.

In at least one disclosed embodiment, the scout vehicle is manually controlled along the actual trajectory by a scout driver. In this case, a check of the scout trajectory by a human driver is provided.

To manually control the scout vehicle, a driver in the scout vehicle can directly access the control devices of the scout vehicle, for example, by means of the steering wheel or pedals of the scout vehicle. Furthermore, remote control of the scout vehicle may be provided. In this case, the driver can be assisted by driver assistance systems of the scout vehicle which allow a certain degree of automation. In this case, the actual trajectory of the scout vehicle is determined partially on the basis of manual inputs and partially in an automatic manner.

In another disclosed embodiment, the reference trajectory data and/or the reference environmental data are also produced on the basis of the desired trajectory and/or the following vehicle environmental data. This allows the reference trajectory data and reference environmental data to be continuously updated.

Data from following vehicles which have driven on a route section or a trajectory in an automated manner can be used to check, complete, renew and/or update the existing data record. For example, some environmental data may change over time, for instance the vegetation at the edge of the road over the course of the year or billboards; aging phenomena or replacements, for instance of the road surface or of traffic signs on the road, may also occur, for instance. Filter algorithms can be used to detect which changes make it necessary only to update the existing data records or which changes are so serious that the automatic drivability of the trajectory is in question.

In one development, the scout trajectory, the scout environmental data, the desired trajectory, the following vehicle environmental data and/or the substitute trajectory are transmitted to an external server. The transmission of the data can therefore be managed by the external server and a greater temporal and spatial offset when the trajectory is driven on by the scout vehicle and the following vehicle is enabled.

When automatically driving on a trajectory, following vehicles can transmit the desired trajectory produced and finally driven on by them and the environmental data captured by them to the server.

The external server can store and manage the data transmitted to it. Furthermore, data can also be transmitted to the vehicles via a bidirectional connection, with the result that there is no need for a direct connection between the vehicles.

In at least one disclosed embodiment, the reference trajectory data and/or the reference environmental data are produced by the external server and are transmitted from the external server to the following vehicle. Central management of the reference data can therefore be provided.

Various data relating to automatically drivable trajectories, which are transmitted to the server, and the corresponding environmental data can therefore be linked to one another and processed in various ways. Data from various sources, for instance when the trajectory is repeatedly driven on by scout vehicles, can be used, for example, to complete or update trajectory data and/or environmental data. The central management of the reference trajectory data and reference environmental data also allows these data to be distributed to following vehicles in a flexible and anticipatory manner. For example, the relevant data can already be transmitted during the planning of a journey without the need for a permanent connection for this purpose between the following vehicle and external data sources such as a scout vehicle and/or an external server. Reference trajectory data and reference environmental data can also be pooled and combined in any desired manner by the external server.

This also makes it possible to centrally optimize the production of the reference trajectory data and the reference environmental data without the need to update software of the scout vehicle, for example, for this purpose.

Provision may be made for route sections stored by the external server to be able to be marked as automatically drivable or not automatically drivable. For example, reference trajectory data and/or reference environmental data relating to a particular route section can be marked as not automatically drivable if significant deviations have been detected for one or more following vehicles and these vehicles have then activated the safe driving mode. New reference trajectory data and reference environmental data can be produced on the basis of the data captured by such following vehicles. In addition, a route section can be marked as automatically drivable again after the data record has been renewed.

In at least one disclosed embodiment, the reference trajectory data and/or the reference environmental data are also produced on the basis of additional data. This allows the inclusion of further data.

For example, it is possible to use data from external data sources, for instance from databases or the Internet. Furthermore, manual additions, changes and/or corrections can be made, for example, by manually editing the data. This can be carried out when managing the data and producing the reference trajectory data and reference environmental data on an external server.

In another disclosed embodiment, a following vehicle driver activates the safe driving mode of the following vehicle. This makes it possible to manually check the automatic drivability of a desired trajectory.

The following vehicle driver can assess whether he considers the desired trajectory produced to be useful and automatically drivable in a safe manner. Furthermore, the reference trajectory data can be output to the driver. Furthermore, information relating to the environmental data, in particular the environment similarity and/or trajectory similarity determined, can be output. In this case, provision may be made for the following vehicle driver to be able to intervene in the control of the following vehicle to assume the guidance himself.

In one development, image data are captured by the scout sensors and the following vehicle sensors. This makes it possible to capture visual environmental data. These data typically have a very high information density and allow distinctive structures in the environment and complex traffic situations to be detected using methods which are known per se.

In another disclosed embodiment, the scout trajectory and/or the desired trajectory is/are produced using an image processing system. In this case, the image processing system can also determines a trajectory quality. It is therefore possible to take into account the detection reliability of the image processing system.

According to the disclosed embodiments, "trajectory quality" is understood as meaning a measure of how great the uncertainties are with which the determination of a trajectory is associated. For example, the scout trajectory can be automatically produced on the basis of sensor data. Image recognition, for instance, can be carried out, for instance to detect traffic signs and extract their contents. In this case, for example, owing to suboptimal visibility conditions, an uncertainty may occur and needs to be taken into account when assessing the scout trajectory.

Furthermore, the measured values from the sensors have particular variances which are taken into account when determining the scout trajectory. The reference trajectory data comprise information relating to the scout trajectory quality.

In at least one disclosed embodiments, the following vehicle receives a request signal and a driving mode as the scout vehicle is activated on the basis of the request signal for the following vehicle. As a result, it is possible to request that the following vehicle assume the role of a scout vehicle and that new trajectory data and/or environmental data be captured by the following vehicle.

This means that the following vehicle which is typically in the automatic driving mode can transitionally act as scout on request. The request signal can also be received if the trajectory similarity and/or the environmental data similarity do(es) not fall below the threshold values for activating the safe driving mode.

The request signal can be received in various ways. For example, an input by a user in the following vehicle can be captured or the request signal can be transmitted from the external server to the following vehicle. The request signal can also be produced automatically, for instance if the driving mode as a scout vehicle is intended to be activated as a result of a criterion other than the trajectory similarity or the environmental data similarity.

The driving mode of the following vehicle as a scout vehicle corresponds substantially to the safe driving mode, that is to say manual control of the following vehicle can be activated, for example, the following vehicle being guided along a substitute trajectory by a following vehicle driver. Furthermore, the substitute trajectory can be captured by means of the following vehicle sensors. The reference trajectory data can now be newly produced on the basis of the captured substitute trajectory and the reference environmental data can be newly produced on the basis of the following vehicle environmental data.

In the disclosed system for automatically controlling at least one following vehicle using a scout vehicle, the scout vehicle comprises a scout journey planner which can produce a scout trajectory for the scout vehicle. It also comprises a scout control device which can guide the scout vehicle along an actual trajectory, and scout sensors which can capture the actual trajectory of the scout vehicle and scout environmental data. In this case, the following vehicle comprises a following vehicle journey planner which can produce a desired trajectory for the following vehicle, and following vehicle sensors which can capture following vehicle environmental data. It also comprises a following vehicle control device which can guide the following vehicle along the desired trajectory. In this case, a computing unit can produce reference trajectory data on the basis of the actual trajectory of the scout vehicle and can produce reference environmental data on the basis of the scout environmental data. The reference trajectory data and the reference environmental data can be transmitted to the following vehicle, and a comparison unit can be used to determine a trajectory similarity by means of a trajectory comparison on the basis of the desired trajectory produced and the transmitted reference trajectory data. The comparison unit can be used to determine an environment similarity by means of an environmental data comparison on the basis of the captured following vehicle environmental data and the transmitted reference environmental data. Finally, if the trajectory similarity and/or the environment similarity do(es) not exceed a particular threshold value, the following vehicle control device can activate a safe driving mode of the following vehicle.

The disclosed system is designed to implement the method according to the embodiments described above. The disclosed system therefore has the same benefits as the disclosed method.

In at least one disclosed embodiment of the system, manual control of the following vehicle can be activated in the safe driving mode of the following vehicle, the following vehicle being able to be guided along a substitute trajectory by a following vehicle driver and the substitute trajectory being able to be captured by means of the following vehicle sensors. In this case, the reference trajectory data can be newly produced on the basis of the captured substitute trajectory, and the reference environmental data can be newly produced on the basis of the following vehicle environmental data.

This allows the reference trajectory data and reference environmental data to be renewed and/or supplemented after deviations of the desired trajectory and/or of the following vehicle environmental data from the old reference data have been detected.

In another disclosed embodiment, the reference trajectory data and/or the reference environmental data can also be produced on the basis of the desired trajectory and/or the following vehicle environmental data. The reference data can therefore be supplemented with data from the automatically guided following vehicle.

In one development, the scout trajectory, the scout environmental data, the desired trajectory, the following vehicle environmental data and/or the substitute trajectory can be transmitted to an external server, the reference trajectory data and/or the reference environmental data being able to be produced by the external server and being able to be transmitted from the external server to the following vehicle. This makes it possible to centrally manage the data.

It is possible to combine, complete and/or update data from different sources. Furthermore, the reference trajectory data and/or reference environmental data can be produced by the external server. The relevant data can also be made available to different vehicles without the need for a direct data connection for this purpose; the transmission can also be carried out in a temporally offset manner.

An exemplary embodiment of the disclosed system is explained with reference to FIG. 1.

The system comprises a scout vehicle 1, a following vehicle 2 and an external server 3. The scout vehicle 1 and the following vehicle 2 are at least occasionally connected to the external server 3 using data technology. For this purpose, the system comprises data interfaces 10 and 20 of the scout vehicle 1 and of the following vehicle 2. In this manner, data can be transmitted from the vehicles to the external server 3, can be stored there and can be transmitted from the external server 3 to the vehicles. This makes it possible to indirectly interchange data between the scout vehicle 1 and the following vehicle 2 without the need for a direct connection between the two.

The connection using data technology can be effected wirelessly, for example, by means of a local area network or a larger network, for example, the Internet. Furthermore, the connection can be established via a telecommunications network, for instance a telephone network, or a wireless local area network (WLAN). The connection can also be established indirectly via a further unit which itself can establish a connection to the external server. For example, a connection using data technology may exist between the mobile unit and a mobile telephone connected to the Internet, for instance by means of a data cable or a radio connection, for instance by means of Bluetooth. The connection to the external server 3 can be established via the Internet.

In another exemplary embodiment, the scout vehicle 1 and the following vehicle 2 are directly connected to one another as an alternative or in addition to the external server 3. In this case, the system does not necessarily comprise the external server 3. In this case, data can be interchanged directly between the vehicles.

The scout vehicle 1 comprises a control unit 13 to which the data interface 10, a journey planner 12 and a capture unit 11 are coupled. The journey planner 12 of the scout vehicle 1 produces a scout trajectory. Furthermore, the capture unit 11 captures scout environmental data. The scout vehicle 1 also comprises an autopilot 14 which can guide the scout vehicle 1 in an entirely or partially automatic manner.

In the present example, the scout vehicle 1 is guided along an actual trajectory by a driver, in which case the driver is assisted by the autopilot 14 which is used to carry out driving maneuvers in various degrees of automation. The automatic interventions by the autopilot 14 in the control are carried out according to methods which are known per se, by means of automatic interventions of the longitudinal and lateral acceleration of the scout vehicle 1. This makes it possible to control the direction and magnitude of the vehicle speed. In this case, the autopilot starts from a scout trajectory determined by the journey planner 12 of the scout vehicle 1, but the actual trajectory actually driven on by the scout vehicle 1 may differ from the scout trajectory produced, for instance if obstacles have to be evaded, if the traffic flow requires deviation from the previously calculated trajectory or if the driver of the following vehicle would like to drive a different trajectory. The fully or partially automatic control by the autopilot 14 presupposes that this has been activated by the control unit 13.

Furthermore, sensors of the capture unit 11 capture image data in the environment of the scout vehicle 1, in which case infrared cameras are also used in addition to sensors for the visible part of the light spectrum. Radar and lidar sensors are also used. In further disclosed embodiments, any desired further suitable sensors of the scout vehicle 1 can be used. The captured environmental data comprise characteristic features in the environment of the trajectory which has been driven on, for example, features of the ground which has been driven on, for example, the route course, road markings or the state of the ground covering, signs, buildings, plants and landscape features in the environment of the route.

A trajectory quality is also determined when producing the scout trajectory by means of the journey planner 12. In this case, the certainty with which the automatically produced scout trajectory has been determined is quantified. For example, image data provided by the capture unit 11 can be used to detect when poor visibility conditions prevail or particular situations can be automatically assessed with difficulty. For example, this may be due to a confusing traffic situation or poorly legible traffic signs. In this case, the trajectory quality expresses that the scout trajectory produced should be carefully assessed and the automatic journey should possibly be assisted by further safety systems and redundant devices of the vehicle.

The actual movement of the scout vehicle 1 along the actual trajectory is captured by the capture unit 11. In this case, the actual trajectory of the scout vehicle 1 is determined according to methods known per se, on the basis of the data from a satellite-based positioning system.

In a similar manner to the scout vehicle 1, the following vehicle 2 also comprises a control unit 23 which is coupled to the data interface 20, a journey planner 22 and a capture unit 21. It also comprises an autopilot 24 which can automatically control the following vehicle 2. The capture unit 21 captures following vehicle environmental data. Provision may also be made for sensors of the capture unit 21 to capture the trajectory which has actually been driven by the following vehicle 2.

In the exemplary embodiment illustrated, the external server 3 comprises a computing unit which can produce reference data records, in particular reference trajectory data and reference environmental data, on the basis of data captured by the scout vehicle 1 or the following vehicle 2. The control units 13, 23 of the scout vehicle 1 and of the following vehicle 2 also comprise comparison units which can carry out the comparisons of data relating to trajectories and environmental data.

An exemplary embodiment of the disclosed method is explained with reference to FIGS. 1 and 2.

Figure 2:
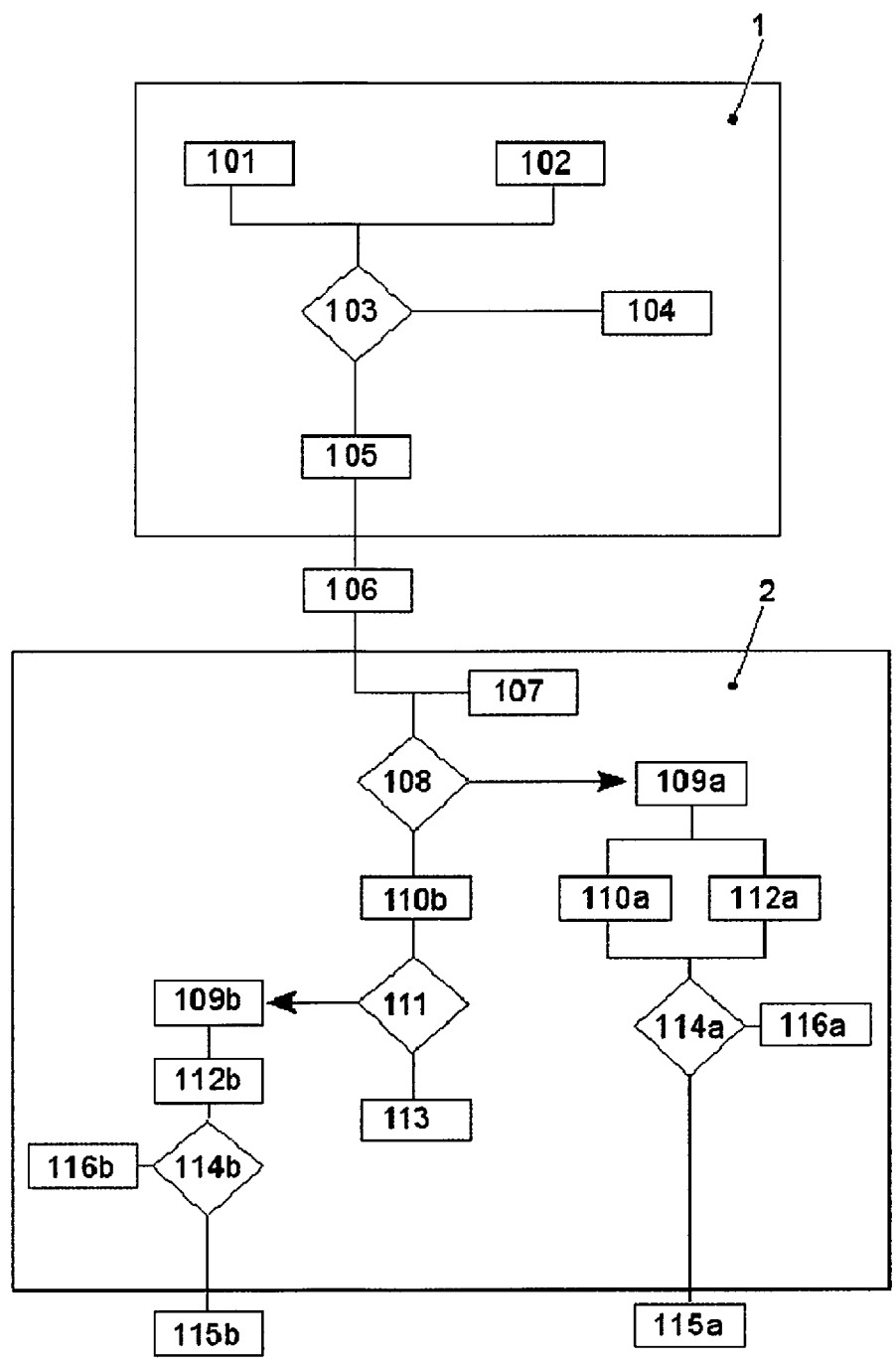
FIG. 2 shows an exemplary embodiment of the disclosed method.

In this example, the disclosed method is implemented by the system illustrated in FIG. 1. The presentation of the operations which are used to carry out the disclosed method does not necessarily reflect the order in which individual operations are carried out. These operations can also be carried out with a greater or shorter temporal interval or at the same time. Furthermore, there is only an exemplary illustration of which operations are carried out by which component of the system. This can differ in other exemplary embodiments; in particular, the external server 3 can carry out operations which are illustrated here as belonging to the vehicles.

In an operation at 101, the journey planner 12 determines a scout trajectory in the scout vehicle 1. The scout vehicle 1 is guided along the actual trajectory by the driver, possibly with the assistance of the autopilot 14 of the scout vehicle 1. The actual trajectory is captured in an operation at 102. In a subsequent operation at 103, the scout and actual trajectories are compared and it is therefore determined whether the journey planner 12 arrives at substantially the same result as the driver. If this is not the case, the disclosed method is aborted in an operation at 104 and the trajectory is assessed as not automatically drivable.

In a next operation at 105, sensors of the capture unit 11 capture scout environmental data. The scout environmental data can be continuously captured, whereas the scout and actual trajectories are produced and compared in the other operations.

In an operation at 106, the actual trajectory and scout environmental data are transmitted to the following vehicle 2, a processing operation possibly preceding the actual transmission. In this case, only relevant data are transmitted, for instance those scout environmental data which have been determined as particularly characteristic of the course of the actual trajectory or those parts of the actual trajectory which have been identified as relevant to the following vehicle 2.

The transmitted data are referred to as "reference trajectory data" and "reference environmental data". These reference data are transmitted in a suitable format and can be evaluated by the following vehicle and can be compared with other data. In one example, the reference trajectory data may correspond to the actual trajectory and the reference environmental data may correspond to the scout environmental data. Furthermore, the reference data may also be produced differently, however, and may comprise, for example, trajectory and environmental data relating to other vehicles or at different times. In this case, the reference data can be continuously updated thus ensuring that reference data which are as current and relevant as possible are always transmitted.

In another exemplary embodiment, the scout trajectory is transmitted as an alternative or in addition to the actual trajectory.

In this case, a bidirectional connection between the scout vehicle 1 and the following vehicle 2 can be used to interchange information relating to the data to be transmitted. The following vehicle 2 can request the transmission of reference data and can specify the type of requested data in its request.

The transmission is carried out here indirectly via the external server 3, as shown in FIG. 1. In this example, the external server 3 assumes the task of a memory and a management means for the reference data. In another exemplary embodiment, a direct connection exists between the scout vehicle 1 and the following vehicle 2.

In another exemplary embodiment, the actual trajectory is not transmitted to the following vehicle 2, but rather sensors of the capture unit 21 of the following vehicle 2 capture the actual trajectory of the scout vehicle 1 if the latter is in the visual range in front of the following vehicle.

In an operation at 107, the journey planner 22 of the following vehicle 2 produces a desired trajectory for the following vehicle 2. In a further operation at 108, the desired trajectory and the reference trajectory data are compared and a trajectory similarity is determined. The trajectory similarity quantifies the differences between the compared trajectories and its value is higher, the more similar the trajectories are. The trajectory comparison can be carried out in various ways; in particular, spatial distances of the trajectories with respect to one another can be quantified and the course of the trajectories can be compared on the basis of their derivative. Differences between the trajectories are weighted by means of a filter algorithm, according to how relevant they are to the automatic drivability of the desired trajectory. For example, traffic-related swerving on account of a vehicle moving back into a lane is weighted as less relevant than a considerable deviation of the direction of travel, for instance on account of roadworks. Other deviations can be taken into account more strongly, for instance rapid direction changes or road chicanes, for instance in the case of roadworks. Further data beyond the mere trajectories can also be taken into account when producing the trajectory similarity, for example, by the systems for producing the trajectories.

If the trajectory similarity determined in the operation at 108 falls below a defined threshold value, the automatically planned desired trajectory is assessed as not automatically drivable in a safe manner in an operation at 109a since the scout vehicle 1 has not driven on the automatically produced desired trajectory.

In contrast, if the threshold value is reached or exceeded, the desired trajectory is initially assessed as automatically drivable since the journey planner 22 of the following vehicle 2 has selected the same trajectory as was previously driven on by the scout vehicle. This is used to derive the information that the following vehicle 2 is substantially on the same trajectory as the scout vehicle 1 beforehand. In a subsequent operation at 110b, following vehicle environmental data are captured. This is carried out in a similar manner to the capture of the scout environmental data by the scout vehicle 1 in the operation at 105.

In an operation at 111, the reference environmental data which have been transmitted to the following vehicle 2 in the operation at 106 are now compared with the captured following vehicle environmental data. A threshold value is determined for the environmental data similarity, in which case the automatically planned desired trajectory is assessed as not automatically drivable in an operation at 109b if the threshold value is undershot. However, if the environmental data similarity exceeds the threshold value, the desired trajectory is assessed as automatically drivable. In an operation at 113, the automatic control of the following vehicle 2 along the desired trajectory is then activated. In this case, the autopilot 24 of the following vehicle 2 assumes the control of the following vehicle 2 in the longitudinal and transverse directions. This is carried out on the basis of data captured by the capture unit 21, for instance information relating to positions and the movement of other road users, the road course, obstacles on the road and traffic law restrictions such as speed restrictions or overtaking bans.

If the trajectory similarity determined in the operation at 108 and/or the environmental data similarity determined in the operation at 111 do(es) not reach the respectively determined threshold value, the desired trajectory is assessed as not automatically drivable in the operation at 109a, 109b and the automatic control is not activated. Differences in the trajectory data and/or environmental data indicate that features characteristic of the desired trajectory differ from features of the scout trajectory, that is to say that changes have emerged since the route was driven on by the scout vehicle 1. It is therefore assumed that features of the trajectory which are relevant to the safety of an automatic journey have also changed and the assessment of the automatic drivability of the trajectory by the scout vehicle 1 is not correct (any more).

In the operation at 109a, 109b, a safe driving mode of the following vehicle 2 is therefore activated with manual control by the driver of the following vehicle 2. The driver guides the following vehicle 2 along a substitute trajectory which has actually been travelled. In other exemplary embodiments, the driver may be in the scout vehicle 1, for example, or may transmit control signals to the following vehicle 2 from an operations center via the external server 3.

The following vehicle 2 now assumes a role similar to the scout vehicle 1 in operations 101 to 105 described above: if the desired trajectory has been assessed as not automatically drivable in the operation at 109a on account of the inadequate trajectory similarity, following vehicle environmental data are captured in a subsequent operation at 110a. This is carried out in a similar manner to the capture of the scout environmental data by the scout vehicle 1 in the operation at 105. In contrast, if the desired trajectory has been assessed as not automatically drivable in the operation at 109b on account of excessively low environmental data similarity, the following vehicle environmental data have already been captured in the operation at 110b and can therefore be used for the further method.

The substitute trajectory along which the following vehicle 2 is manually controlled is now captured in an operation at 112a, 112b. This substitute trajectory is compared with the desired trajectory of the following vehicle 2, produced in the operation at 107, in a further operation at 114a, 114b. If the trajectory similarity of the two trajectories exceeds a particular threshold value, this is interpreted as manual confirmation of the automatically produced desired trajectory. The desired trajectory produced in the operation at 107 is therefore automatically drivable and new reference trajectory data and reference environmental data are produced in an operation at 115a, 115b on the basis of the actual manual substitute trajectory of the following vehicle 2 and the following vehicle environmental data. If the required trajectory similarity does not exist, the desired trajectory is assessed as not automatically drivable and the method is aborted in an operation at 116a, 116b.

Figure 3A:
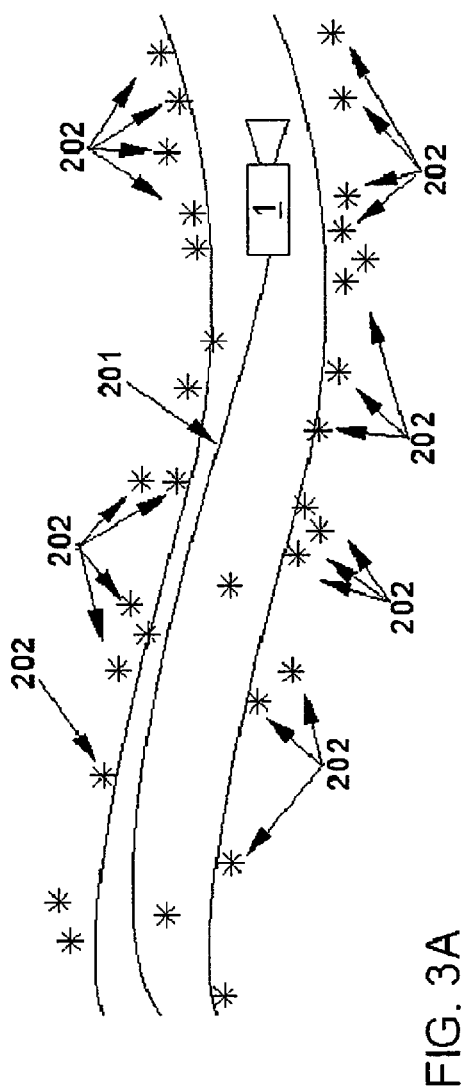
FIG. 3A shows a further exemplary embodiment of the disclosed method.
Figure 3B:
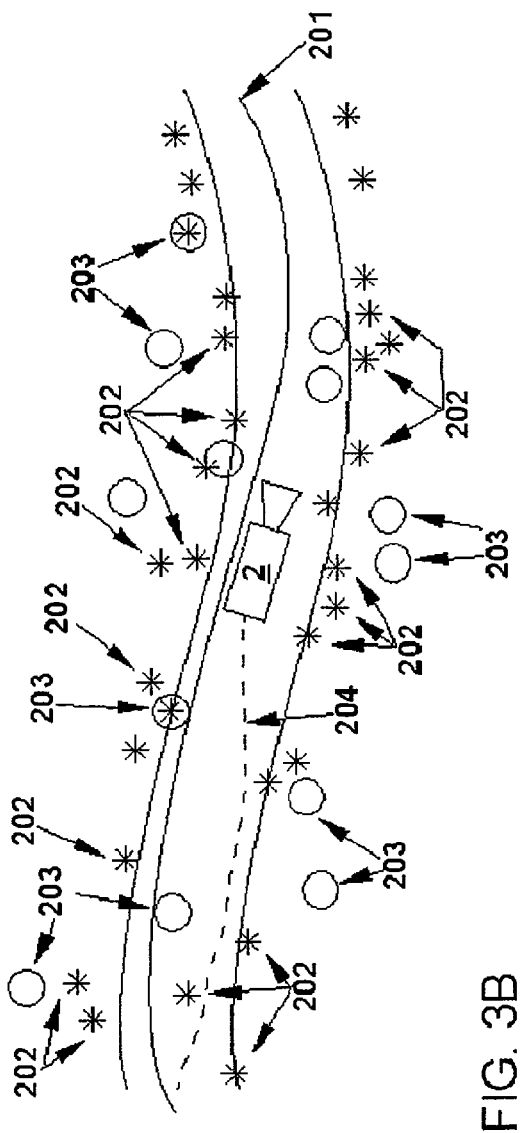
FIG. 3B shows a further exemplary embodiment of the disclosed method.

Another exemplary embodiment of the disclosed method is explained on the basis of FIGS. 3A and 3B. In this example, the disclosed method is implemented by the system illustrated in FIG. 1.

The scout vehicle 1 first of all drives on a route along an actual trajectory 201, the actual trajectory 201 being captured. Meanwhile, the sensors of the capture unit 11 of the scout vehicle 1 capture scout environmental data 202 which comprise scout orientation points and are illustrated as stars in FIGS. 3A and 3B. In the case illustrated, these are traffic signs on the road and at the edge of the route as well as buildings and special landscape features, for instance individual trees, in the environment of the actual trajectory 201.

At the same time, the journey planner 12 of the scout vehicle 1 produces a scout trajectory. This is compared with the actual trajectory 201. If the trajectory similarity produced in this case exceeds a particular threshold value, the driver has manually selected the same trajectory as the automatic journey planner 12 and the automatically generated scout trajectory is assessed as automatically drivable. Reference trajectory data are produced on the basis of the actual trajectory 201 and the scout trajectory of the scout vehicle 1 and are transmitted to the following vehicle 2. Furthermore, reference environmental data are produced on the basis of the scout environmental data and are transmitted to the following vehicle 2. In the example illustrated, the reference environmental data comprise the scout orientation points 202.

The following vehicle 2 drives on the same route. The journey planner 22 of the following vehicle 2 produces a desired trajectory 204. These are compared with the desired trajectory 204. In the case illustrated, the trajectory similarity is lower than a particular threshold value, that is to say the trajectories are considerably different. Differences between the trajectories are weighted by means of a filter algorithm, according to how relevant they are to the automatic drivability of the desired trajectory 204. For example, traffic-related swerving on account of a vehicle moving back into a lane is weighted as less relevant than a considerable deviation of the direction of travel, for instance on account of roadworks. Other deviations can be taken into account more strongly, for instance rapid direction changes or road chicanes, for instance in the case of roadworks.

The following vehicle 2 also captures its own following vehicle environmental data with following vehicle orientation points 203 and compares them with the reference environmental data. In the case illustrated, only a few of the scout orientation points 202 match the following vehicle orientation points 203 captured by the following vehicle 2. For example, traffic signs or the positions of traffic structures no longer match.

During the comparison, the different features are prioritized. For example, the consequences for the environmental data similarity are less serious if some of the planted vegetation at the edge of the route has changed than if the course of a lane has changed. Furthermore, vehicle data relating to the scout vehicle 1 are taken into account, for instance its height which need not be identical to the height of the following vehicle 2.

In a comparison, an environmental data similarity is determined which does not reach a previously determined threshold value in the case illustrated. Therefore, the automatic control along the desired trajectory 204 on the basis of the autopilot 24 is not activated for the following vehicle 2, but rather the driver of the following vehicle 2 guides the following vehicle 2 along a substitute trajectory. As described above with reference to FIG. 2, the following vehicle 2 now assumes the role of the scout vehicle 1 and checks whether the substitute trajectory manually travelled by the driver matches the desired trajectory 204 automatically produced by the journey planner 22. If this is the case, the desired trajectory 204 is assessed as automatically drivable and new reference trajectory data are produced and new reference environmental data are likewise produced on the basis of the following vehicle environmental data. These can then be transmitted to a further subsequent vehicle.

In another exemplary embodiment, trajectory data and environmental data, in particular also from different vehicles, are stored by the external server 3 and the reference data are produced on the basis of these data and are transmitted to the following vehicle 2. This central storage makes it possible to expand and/or update the reference data, for example, on the basis of the following vehicle environmental data captured by the following vehicle 2 and transmitted to the external server 3: if it is detected in this case, for instance, that one of the scout orientation points 202 is no longer present, for example, because a parked vehicle has been moved along at the edge of the route, the data record stored on the external server 3 can be accordingly adapted. In this case, a filter algorithm determines whether the changes are minor and an adaptation can therefore be carried out or whether the changes restrict the automatic drivability of the scout trajectory 201, which makes it necessary to newly capture scout environmental data 202 along the scout trajectory 201 by means of a manually guided scout vehicle 1.

In another exemplary embodiment, the following vehicle 2 does not capture one of the following vehicle orientation points 203 with sufficient quality; for example, a traffic sign cannot be automatically read with sufficient certainty in poor visibility conditions. Following vehicle environmental data, image data relating to the traffic sign in this example, are now transmitted to the scout vehicle 1, the driver of which acts as a decision point. The driver can now decide whether the automatic journey can be safely continued and can transmit control signals, for instance, to the following vehicle 2, which control signals represent the content of the traffic sign. The decision point can also be incorporated in the system via the external server 3.

In another exemplary embodiment, a series of further data may also be taken into account when producing the reference environmental data or reference trajectory data. The external server 3 accesses further data sources via the Internet and there captures, for example, data relating to temporary or permanent changes in the route guidance or additional information relating to a trajectory, for instance a road section, for example, a blockage for automatic driving.

In another exemplary embodiment, the following vehicle 2 receives a request signal from the external server 3. A driving mode as a scout vehicle 1 is now activated for the following vehicle 2. In the exemplary embodiment, this driving mode as a scout vehicle 1 corresponds to the behavior described above for the situation in which the trajectory similarity and/or the environmental data similarity do(es) not reach the predefined threshold value. Manual control of the following vehicle 2 is therefore activated in this driving mode and control along a substitute trajectory is carried out. In this case, the following vehicle 2 acts as the scout vehicle 1, that is to say captures trajectory data and environmental data along the substitute trajectory. A comparison of the substitute trajectory which has actually been travelled and the desired trajectory 204 produced by the journey planner 22 of the following vehicle 2 provides a trajectory similarity which can be used to determine automatic drivability of the substitute trajectory. The captured data may also be transmitted to the external server 3.

LIST OF REFERENCE SYMBOLS

1 Scout vehicle
2 Following vehicle
3 External server; center
10 Data interface (scout vehicle)
11 Sensors (scout vehicle)
12 Scheduler (scout vehicle)
13 Control unit (scout vehicle)
14 Autopilot (scout vehicle)
20 Data interface (following vehicle)
21 Sensors (following vehicle)
22 Journey planner (following vehicle)
23 Control unit (following vehicle)
24 Autopilot (following vehicle)
101 Production of scout trajectory
102 Capture of actual trajectory
103 Comparison of scout and actual trajectories
104 Assessment of the scout trajectory as not drivable in an automated manner
105 Capture of scout environmental data
106 Transmission of reference data
107 Production of desired trajectory
108 Comparison of scout and desired trajectories
109*a*, 109*b* Activation of manual control of the following vehicle
110*a*, 110*b* Capture of following vehicle environmental data
111 Comparison of scout and following vehicle environmental data
112*a*, 112*b* Capture of the actual trajectory of the following vehicle
113 Activation of the automatic control of the following vehicle
114*a*, 114*b* Comparison of desired trajectory and actual trajectory of the following vehicle
115*a*, 115*b* Production of new reference data
116*a*, 116*b* Assessment of the desired trajectory as not automatically drivable
201 Actual trajectory of the scout vehicle
202 Scout orientation points; scout environmental data (stars)
203 Following vehicle orientation points; following vehicle environmental data (circles)
204 Desired trajectory of the following vehicle

The invention claimed is:

1. A method for automatically controlling at least one following vehicle, the method comprising:
producing a scout trajectory for a scout vehicle;
guiding the scout vehicle along an actual trajectory, the actual trajectory of the scout vehicle and scout environmental data is captured by scout sensors;
producing a desired trajectory for the following vehicle and following vehicle environmental data are captured by following vehicle sensors;
determining a scout trajectory similarity based on the scout trajectory produced and the captured actual trajectory, reference trajectory data are produced and reference environmental data are produced based on the scout environmental data;
transmitting the reference trajectory data and the reference environmental data to the following vehicle;
determining a trajectory similarity by a trajectory comparison based on the desired trajectory produced and the transmitted reference trajectory data;
determining an environmental data similarity by an environmental data comparison based on the captured following vehicle environmental data and the transmitted reference environmental data, in which case:
in response to the trajectory similarity and/or the environment similarity exceeding a particular threshold value, automatic control of the following vehicle is activated, and
in response to the trajectory similarity and/or the environment similarity not exceeding a particular threshold value, a safe driving mode of the following vehicle is activated.

2. The method of claim 1, wherein
manual control of the following vehicle is activated in the safe driving mode of the following vehicle;
the following vehicle is guided along a substitute trajectory by a following vehicle driver and the substitute trajectory is captured by the following vehicle sensors;
the reference trajectory data is newly produced based on the captured substitute trajectory; and
the reference environmental data is newly produced based on the following vehicle environmental data.

3. The method of claim 1, wherein the scout vehicle is manually controlled along the actual trajectory by a scout driver.

4. The method of claim 1, wherein the reference trajectory data and/or the reference environmental data are also produced based on the desired trajectory and/or the following vehicle environmental data.

5. The method of claim 1, wherein the scout trajectory, the scout environmental data, the desired trajectory, the following vehicle environmental data, and/or the substitute trajectory are transmitted to an external server.

6. The method of claim 5, wherein the reference trajectory data and/or the reference environmental data are produced by the external server and are transmitted from the external server to the following vehicle.

7. The method of claim 6, wherein the reference trajectory data and/or the reference environmental data are also produced based on additional data.

8. The method of claim 1, wherein a following vehicle driver activates the safe driving mode of the following vehicle.

9. The method of claim 1, wherein image data are captured by the scout sensors and the following vehicle sensors.

10. The method of claim 9, wherein the scout trajectory and/or the desired trajectory is/are produced using an image processing system, the image processing system also determines a trajectory quality.

11. The method of claim 1, wherein the following vehicle receives a request signal and a driving mode as the scout vehicle is activated based on the request signal for the following vehicle.

12. A system for automatically controlling at least one following vehicle using a scout vehicle, the scout vehicle comprising:
a scout journey planner which produces a scout trajectory for the scout vehicle,
a scout control device which guides the scout vehicle along an actual trajectory, and
scout sensors which capture the actual trajectory of the scout vehicle and scout environmental data;
the following vehicle comprising:
a following vehicle journey planner which produces a desired trajectory for the following vehicle, following vehicle sensors which capture following vehicle environmental data, and a following vehicle control device which guides the following vehicle along the desired trajectory;
wherein
a computing unit produces reference trajectory data based on the actual trajectory of the scout vehicle and produces reference environmental data based on the scout environmental data,
the reference trajectory data and the reference environmental data are transmitted to the following vehicle,
the computing unit is used to determine a trajectory similarity by a trajectory comparison based on the desired trajectory produced and the transmitted reference trajectory data,
the computing unit is used to determine an environment similarity by an environmental data comparison based on the captured following vehicle environmental data and the transmitted reference environmental data, and
in response to the trajectory similarity and/or the environment similarity not exceeding a particular threshold value, the following vehicle control device activates a safe driving mode of the following vehicle.

13. The system of claim 12, wherein
manual control of the following vehicle is activated in the safe driving mode of the following vehicle,
the following vehicle is guided along a substitute trajectory by a following vehicle driver and the substitute trajectory is captured by the following vehicle sensors,
the reference trajectory data is newly produced based on the captured substitute trajectory, and
the reference environmental data is newly produced based on the following vehicle environmental data.

14. The system of claim 12, wherein the reference trajectory data and/or the reference environmental data is also produced based on the desired trajectory and/or the following vehicle environmental data.

15. The system of claim 12, wherein
the scout trajectory, the scout environmental data, the desired trajectory, the following vehicle environmental data, and/or the substitute trajectory are transmitted to an external server,
the reference trajectory data and/or the reference environmental data are produced by the external server, and are transmitted from the external server to the following vehicle.

* * * * *